United States Patent [19]
Berson et al.

[11] Patent Number: 5,384,846
[45] Date of Patent: Jan. 24, 1995

[54] SYSTEM AND APPARATUS FOR CONTROLLED PRODUCTION OF A SECURE IDENTIFICATION CARD

[75] Inventors: William Berson, Westport; James R. Marcus, Norwalk, both of Conn.

[73] Assignee: Pitney Bowes Inc., Stamford, Conn.

[21] Appl. No.: 53,937

[22] Filed: Apr. 26, 1993

[51] Int. Cl.$^6$ ............................................. H04K 1/00
[52] U.S. Cl. ...................................... 380/23; 380/21; 380/51; 380/55; 364/464.02
[58] Field of Search ...................... 380/21, 23, 24, 25, 380/30, 49, 50, 51, 54, 55; 235/379, 380; 340/825.33, 825.34; 382/2; 364/464.02

[56] References Cited

U.S. PATENT DOCUMENTS

| | | | |
|---|---|---|---|
| 4,097,923 | 6/1978 | Eckert, Jr. et al. | 380/54 X |
| 4,447,890 | 5/1984 | Duwel et al. | 380/54 X |
| 4,542,465 | 9/1985 | Stockburger et al. | 340/825.34 X |
| 4,811,408 | 3/1989 | GOldman | 382/2 |
| 4,877,946 | 10/1989 | Ando et al. | 235/380 |
| 4,879,747 | 11/1989 | Leighton | 380/23 |
| 4,972,476 | 11/1990 | Nathans | 380/23 |
| 4,991,205 | 2/1991 | Lemelson | 380/5 |
| 4,993,068 | 2/1991 | Piosenka | 380/23 |
| 4,995,081 | 2/1991 | Leighton et al. | 380/23 |
| 5,214,699 | 5/1993 | Monroe et al. | 380/23 |

*Primary Examiner*—Tod R. Swann
*Attorney, Agent, or Firm*—Robert H. Whisker; Melvin J. Scolnick

[57] ABSTRACT

An identification card and system and apparatus for producing and authenticating such an identification card in a controlled manner. An object or other entity for which the identification card will evidence identity, status or characteristics is scanned to produce a digital signal a portion of which is compressed, encrypted, and coded and which is recorded on a magnetic strip on the identification card. The image is also printed or otherwise embodied onto another portion of the identification card. A text message may be appended to the signal before it is encrypted and also printed as plain text on the identification card. In one embodiment the signal representing the image is encrypted using a public key encryption system and the key is downloaded from a center. This key maybe changed from time to time to increase security. To facilitate authentication the corresponding decryption key is encrypted with another key and incorporated on the card. To validate the card the coded message is scanned, decoded, decrypted, expanded and displayed. The card may then be authenticated by comparison of the displayed representation stroboscopically superimposed on the image and the displayed text message with the image and text message printed on the card. A remote data processing center communicates with the apparatus to control and account for production of the cards. In one embodiment the key for encrypting the image is changed each time the data processing center communicates with the apparatus.

6 Claims, 6 Drawing Sheets

SYSTEM AND APPARATUS FOR CONTROLLED PRODUCTION OF A SECURE IDENTIFICATION CARD

BACKGROUND OF THE INVENTION

The subject invention relates to an identification card or similar item which serves as evidence of the identity or status of an object or other entity. More particularly, it relates to an identification card or similar item which has a high degree of security against forgery or tampering, and to methods and apparatus for producing and authenticating such cards. The subject invention relates to, and is an improvement on the invention disclosed in, application Ser. No. 07/979,081; filed: Nov. 20, 1992; to: James R. Marcus, and to the commonly assign application, filed on even date herewith, Ser. No.: 053,945, to: William Berson and Shailendra Kumar.

(As used herein the term "identification card" will preferably refer to an item similar to an identification badge of the type used by businesses to identify their employees, but it is within the contemplation of the subject invention, and as used herein the term "identification card" shall include, without limitation, documents, magnetic disks, CD's, or smart cards, or any other suitable item s, which may record an image together with related data and which may be associated with an object or other entity to be identified).

The identification of objects or other entities is a problem at least as old as history. In modern times the most prevalent solution to this problem is the identification card which serves to establish the identity of the bearer, as well as usually some characteristic, status, or attribute of the bearer. Examples are the employee badge, as noted above, and, most commonly, the driver license. Typically, such identification cards will include a-picture of the nominal bearer as well as relevant information in text form.

While identification cards and the like have generally proven useful for the day to day conduct of affairs nevertheless they are still subject to forgery or tampering, and indeed a moderately sized illegal industry exists for the purpose of providing false identification documents.

For applications where a high degree of security of identification is required, efficient techniques have been developed to recognize fingerprints, voice patterns, retinal patterns, or other characteristics of individuals. such systems are highly successful in uniquely identifying individuals known to the system, but are subject to the disadvantages of requiring highly sophisticated, expensive sensors, which are typically not mobile, and which must be connected to a database which identifies selected individuals in terms of physical characteristics such as fingerprints. Such a database must generally be centrally located, both to protect if from tampering and to facilitate updating. Thus, these sophisticated systems are generally limited to restricting access to secure areas.

As is apparent from the above discussion the most common application of identification cards is to identify persons. However, the problem of identification may extend to a very broad class of objects or other entities. Thus, it may be desirable to be able to establish that a particular item has been inspected, or passed through customs, or was produced by a particular company. Similarly, it may be desirable to have secure evidence of the provenance of an art work, or the pedigree of an animal, or that a person, animal, or plant is free from disease. Such applications, and others which will be apparent to those skilled in the art are within the contemplation of the subject invention.

Perhaps because it relates to information, rather than tangible objects, the identification or authentication of documents or other forms of information has been dealt with perhaps more successfully in the past; usually by use of some form of encryption. Thus, U.S. Pat. No. 4,853,961; for: "Reliable Document Authentication System": to: Pastor; issued: Aug. 1, 1989, discloses a system wherein a document is authenticated by encryption using a public key encryption system. U.S. Pat. No. 4,637,051; to Clark discloses a postage meter having an indicia which is authenticated by encryption. Many other applications of encryption to authenticate information will be known to those skilled in the art.

One approach to the problem of providing secure identification cards is disclosed in the above referenced application to Marcus. This applications discloses an identification card which includes an image of an object to be identified (typically a person's face) on one side, and an encrypted signal representing a compressed representation of that image on the other side. To validate the card the encrypted data is decrypted and a representation of the print image is generated and displayed for comparison with the printed image on the first side.

While this technique has been demonstrated and is generally considered satisfactory, it suffers from the disadvantage that, even with compression, the representation of the image required a large amount of data, typically more than 1000 bytes. This amount of data requires sophisticated, high-density coding techniques, such as the known PDF-417 two-dimensional bar code, to allow all of the data to be incorporated onto a standard sized identification card.

Another problem with such identification cards, and with identification cards generally, is the need to produce such cards at multiple locations while still maintaining central accounting and control. A state, for example, may wish to issue driver licenses at numerous motor vehicle offices throughout the state while maintaining central accounting and control of the total number of licenses issued. Also, a third party provider of these services may wish to allow one or more users to issue such identification cards at one or more locations and may wish to charge for use of the technology on a per card basis.

Thus, it is an object of the subject invention to provide a method and apparatus for producing secure identification cards at one or more remote locations while maintaining central accounting and control of the number of cards produced.

BRIEF SUMMARY OF THE INVENTION

The above object is achieved and the disadvantages of the prior art are overcome in accordance with the subject invention by means of an apparatus and system for producing an identification card. Apparatus for producing an identification card includes a mechanism for scanning an object or other entity to produce a first signal representative of an image of the object or other entity to be identified, and a printer responsive to the scanner for printing the image on a first portion of the identification card. The apparatus also includes a mechanism for encrypting a second signal which includes a representation of at least a portion of the image, the second signal being derived, at least in part, from the first signal, and another mechanism for incorporating a coded representation of the encrypted second signal into a second portion of the identification card. A controller for the apparatus further includes a rechargeable mechanism for limiting the number of identification cards which can be produced unless the rechargeable mechanism is recharged and a communications link for communicating with a remote data processing center to enable recharging of the rechargeable apparatus.

In accordance with one aspect of the subject invention the remote data processing center is responsive to apparatus information received from the apparatus and representative of the state of the apparatus to send reply information to the apparatus; and the apparatus is responsive to the reply information to recharge the rechargeable mechanism.

In accordance with another aspect of the subject invention the second signal is encrypted using an encryption key $E_i$ for a public key encryption system, and a corresponding decryption key, $D_i$, is encrypted with a second encryption key, $E_s$, for the public key encryption system to form an encrypted decryption key, $E_s[D_i]$, and the encrypted decryption key is appended to the second signal prior to incorporation into the second portion of the identification card.

In accordance with another aspect of the subject invention the apparatus and remote data processing center each store identical communication keys and the apparatus includes a mechanism for encrypting a message, the message including apparatus information representative of the current state of apparatus and an apparatus serial number, and the remote data processing center responds to receipt of the apparatus information to send an encrypted reply message including a recharge amount, and the apparatus decrypts the reply message and increments the rechargeable mean by the recharge amount to allow continued production of the identification cards.

In accordance yet another aspect of the subject invention the reply message includes a new encrypted decryption key, $E_s[D_i']$ and the controller of the apparatus replaces the key, $E_s[D_i]$ with the new key for identification cards to produce subsequent to the recharge of the rechargeable mechanism.

Thus, it can be seen that the subject invention achieves the above stated object by providing a method and apparatus for producing an identification card which includes an image which may be easily compared to the object or other entity whose identity is to be verified, and which is highly resistant to forgery or tampering, while allowing remote control of, and accounting for, production of the cards. Other objects and advantages of the subject invention will be readily apparent to those skilled in the art from consideration of the attached drawings and the detailed description set forth below.

DETAILED DESCRIPTION OF THE PREFERRED EMBODIMENTS OF THE SUBJECT INVENTION

Figure 1:
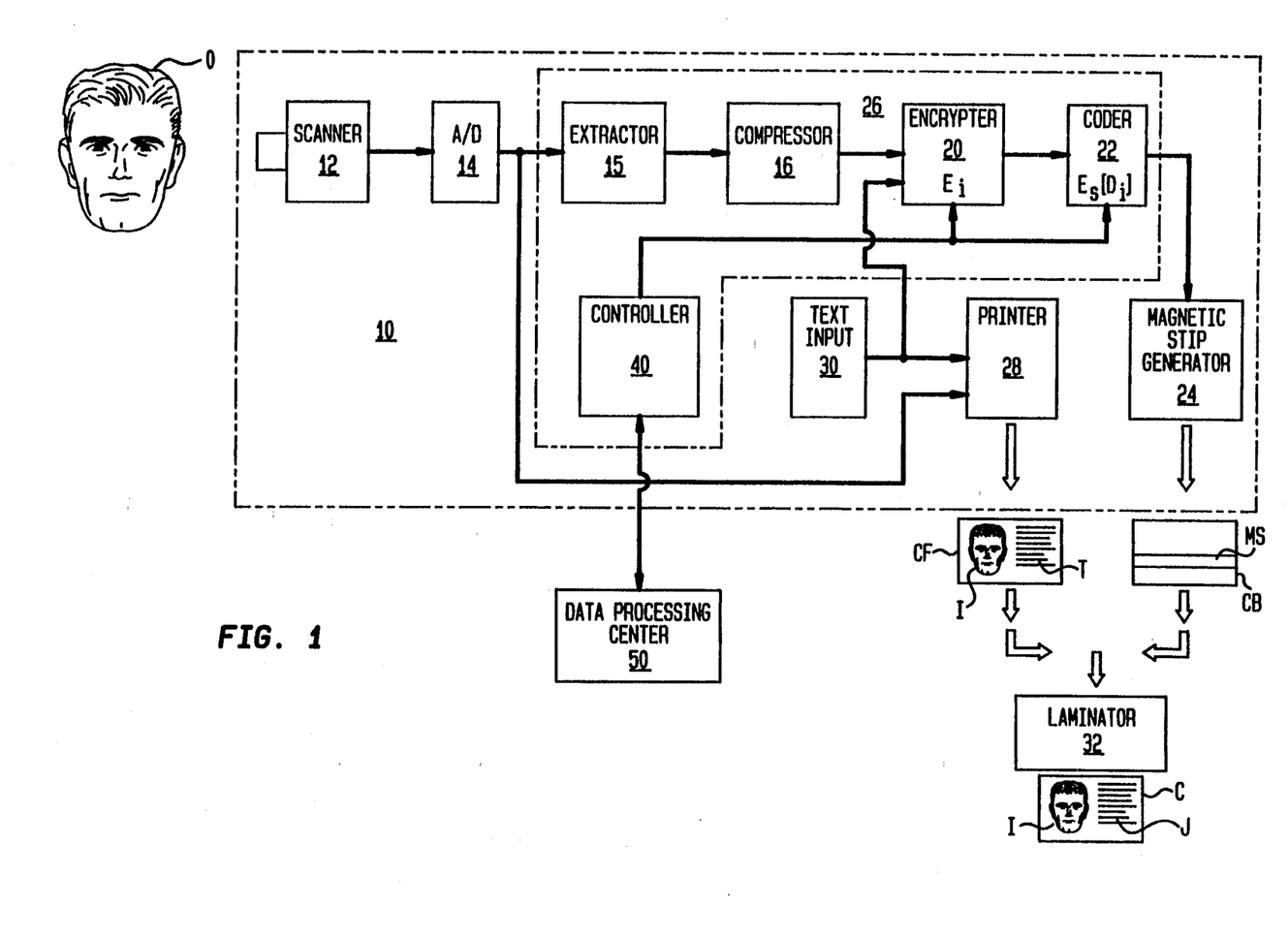
FIG. 1 is a schematic block diagram of a system and apparatus for producing an identification card in accordance with the subject invention.

FIG. 1 shows a schematic block diagram of apparatus 10 for producing an identification card C. A person O (or other object or entity) for whom the identification card is intended is scanned by a conventional video scanner 12 to produce a first signal representative of that person's image. (Equivalently, a previously scanned image of person O may be input from a database of images.) Preferably, the first signal is then converted to a digital form by an analog-to-digital convertor 14 for processing in the digital domain.

Preferably, first signal is then input to extractor 15 which extracts a portion of the first signal representative of a portion of the person's image. Extraction of a portion of a signal representative of an image may be straight forward application of the "windowing" technology familiar to users of personal computers and those who watch split-screen television broadcasts and need not be discussed further here for an understanding of the subject invention.

Other Technology for abstraction of images by reducing the image to a line drawing is available from the Marathon Systems Research Corporation of Minneapolis Minnesota under the trade name "Phototrace" and need not be discussed further here for an understanding of the subject invention.

The extracted portion of the first signal is then input to a compression module 16 where it is compressed to reduce the amount of data which must be stored on identification card C.

Data compression algorithms, specifically adapted for compression of video image signals, are known to those skilled in the art. Preferably, an algorithm known as the JPEG algorithm, which is known and commercially available is used in compressor 16. Further description of the operation of compressor 16 is not believed necessary to an understanding of the subject invention.

The compressed first signal is then input to an encrypter 20 to be included in the encrypted second signal which will be incorporated into identification card C, as will be described further below. Preferably encrypter 20 encrypts the second signal using an encryption key, $E_i$, for a public key encryption system such as the well known RSA system.

The encrypted second signal is then encoded in accordance with some predetermined format by coder module 22, which controls code generator 24 to incorporate the encoded encrypted second signal into magnetic stripe MS on back CB of identification card C.

In accordance with a preferred embodiment of the subject invention extractor module 15, compressor module 16, encrypter module 20, and coder module 22 are implemented as software modules in a microprocessor; which is preferably, an Intel model 80386, or equivalent, or higher capacity microprocessor.

The digitized first signal is also input to printer 20 which may use any appropriate technology for the production of identification card C to print an image of the person O on front CF of identification card C. Front CF and back CB are then combined and laminated using well known technology by laminator 32 to produce identification card C.

In accordance with another preferred embodiment of the subject invention text input 30 is used to input a text message. In one embodiment of the subject invention at least a portion of the text message is combined with the compressed form of the first signal to form the second signal which is encrypted by encrypter module 20 and is also printed as plain text on the front CF of card C. Alternatively, text T may be compressed; as for example by deletion of control characters, which are restored in accordance with a predetermined format when text T is recovered, before text T is incorporated into the second signal. Thus, like image I text T is embodied in card C in both human recognizable form on the front CF an coded form on the back CB of card C. In another embodiment the text message may include a password P which would be encrypted and coded but which would not be printed in plain text on front CF.

To facilitate decryption of the second signal coder module 22 also appends an encrypted decryption key, $E_s[D_i]$ to the second signal before it is incorporated into magnetic stripe MS.

Control of apparatus 10 to limit and account for the number of identification cards C, as well as management of the encryption and decryption keys used, is obtained through the corporation of controller 40 and data processing center 50, as will be described further below.

Figure 2:
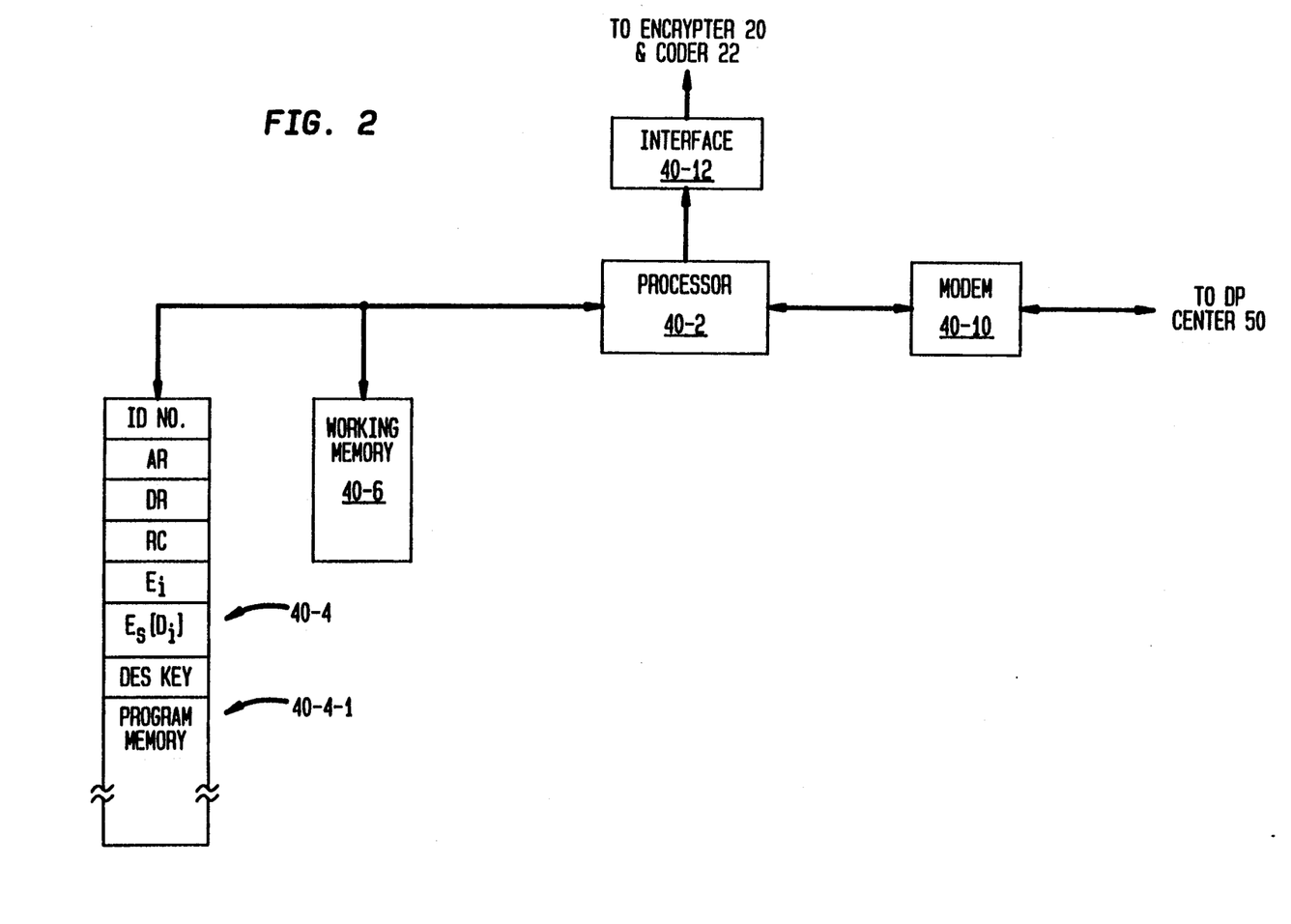
FIG. 2 is a more detailed schematic block diagram of the controller of FIG. 1.

Turning now to FIG. 2 controller 40 includes a processor 40-2, which may be an Intel model 80386, or equivalent, or higher capacity microprocessor. In embodiments of the subject invention where the above describe modules are implemented as software modules processors 40-2 may also serve to implement these modules. Alternatively, various modules of the subject invention may be implemented as hardware modules, or as software modules in a separate processor, in various manners which will be readily apparent to those skilled in the art, and which need not be described further here for an understanding of the subject invention.

Controller 40 also includes non-volatile memory 40-4 which further includes program memory 40-4-1 for storing the operating program for apparatus 10 and additional storage elements for storing various parameters needed in the operation of apparatus 10, as will be described below.

Particularly, non-volatile memory 40-4 stores an ID number or serial number for apparatus 10 which serves to identify apparatus 10 to remote data processor center 50, and ascending register AR and a descending register DR. The descending register stores the number of identification cards which can be produced by apparatus 10 before the apparatus must be recharged, as will be described further below. As each card is produced descending register DR is decremented and ascending register AR is incremented so that the sum of registers AR and DR is a control sum which is equal to the total number of cards which apparatus 10 has been authorized to produce, as will be describe further below. Non-volatile memory 40-4 also stores a recharge count RC representing the number of times apparatus 10 has been recharged, the current values of the incrementing key $E_i$ and the encrypted decryption key $E_s[D_i]$. Memory 40-4 also stores the current value of a communications key used in the well-known Data Encryption System DES, which is used for communication with remote data processing center 50.

In another preferred embodiment, where different charges are made for different types of identification cards the descending and ascending register OR, AR may be charged with dollar amounts, the appropriate charges input as part of text T, and the descending register decremented accordingly.

Preferably, the DES key is updated for each communication between controller 40 and data processing center 50, as will be described further below.

Controller 40 also includes a working memory 40-6, for temporary storage of intermediate results of operation of apparatus 10, modem 40-10, or other convenient, conventional communications link, for communication with data processing center 50, and a conventional interface 40-12 for communication with encrypter module 20 and decoder module 22 to provide encryption code $E_i$ and encrypted decryption code $E_s[D_i]$. Each of these elements of controller 40 is conventional and well understood by those skilled in the art and need not be discussed further here for an understanding of the subject invention.

Figure 3:
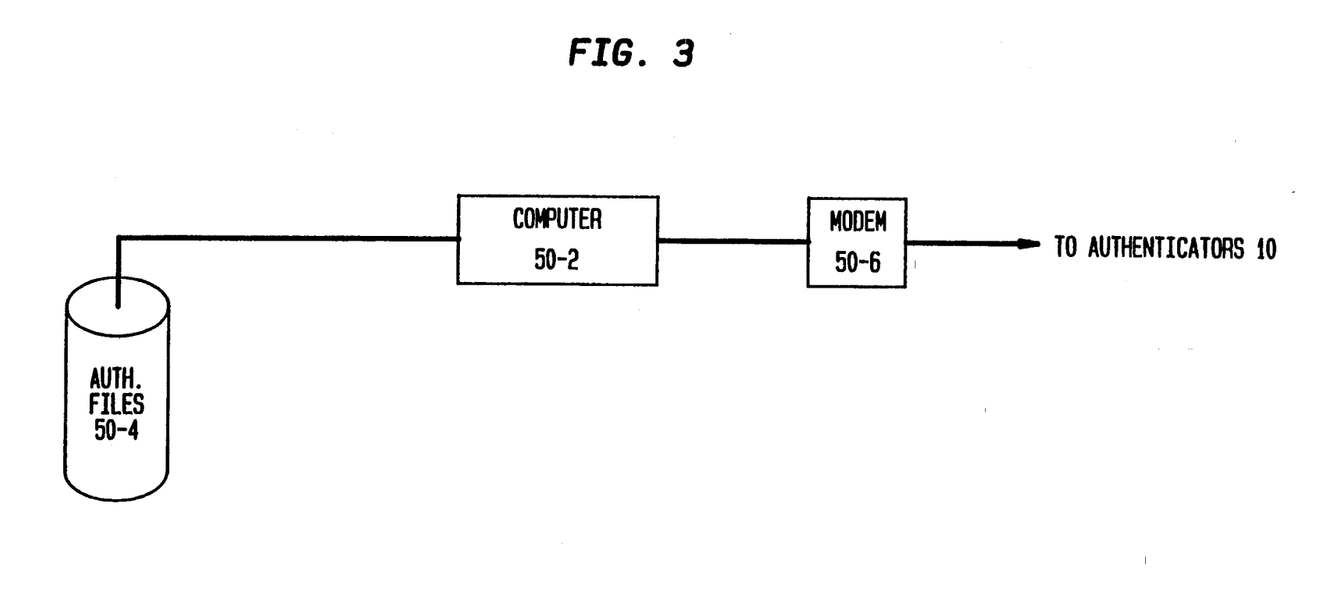
FIG. 3 is a more detailed schematic block diagram of the data processing center of FIG. 1.

Turning to FIG. 3 a more detailed representation of remote data processing center 50 is shown. Center 50 includes a computer, which may be any suitable computer having sufficient capacity to manage communications with a predetermined number of apparatus similar to apparatus 10 for providing secure identification cards. Computer 50-2 is connected to authorization files 50-4 which preferably are maintained off line in a disk file or some other suitable means of mass storage. Files 50-4 include records of the status of apparatus 10 and each similar apparatus connected to data processing center 50 for use in verifying messages received from apparatus 10 and similar apparatus as will be described further below. Files 50-4 may also include accounting files for apparatus 10 and each similar apparatus for maintaining credit or debit accounts to account for payments due for production of identification cards C. Center 50 also includes modem 50-6, or any other conventional communications link, for communication with apparatus 10 or similar apparatus.

Typically an encryption/decryption pair $E_S$, $D_S$ is generated and stored in center 50 and will remain substantially constant during operation of system 10. However, in applications where system 10 is used to produce identification cards C for various organizations different pairs $E_S D_S$ may be used for different organizations.

Figure 4:
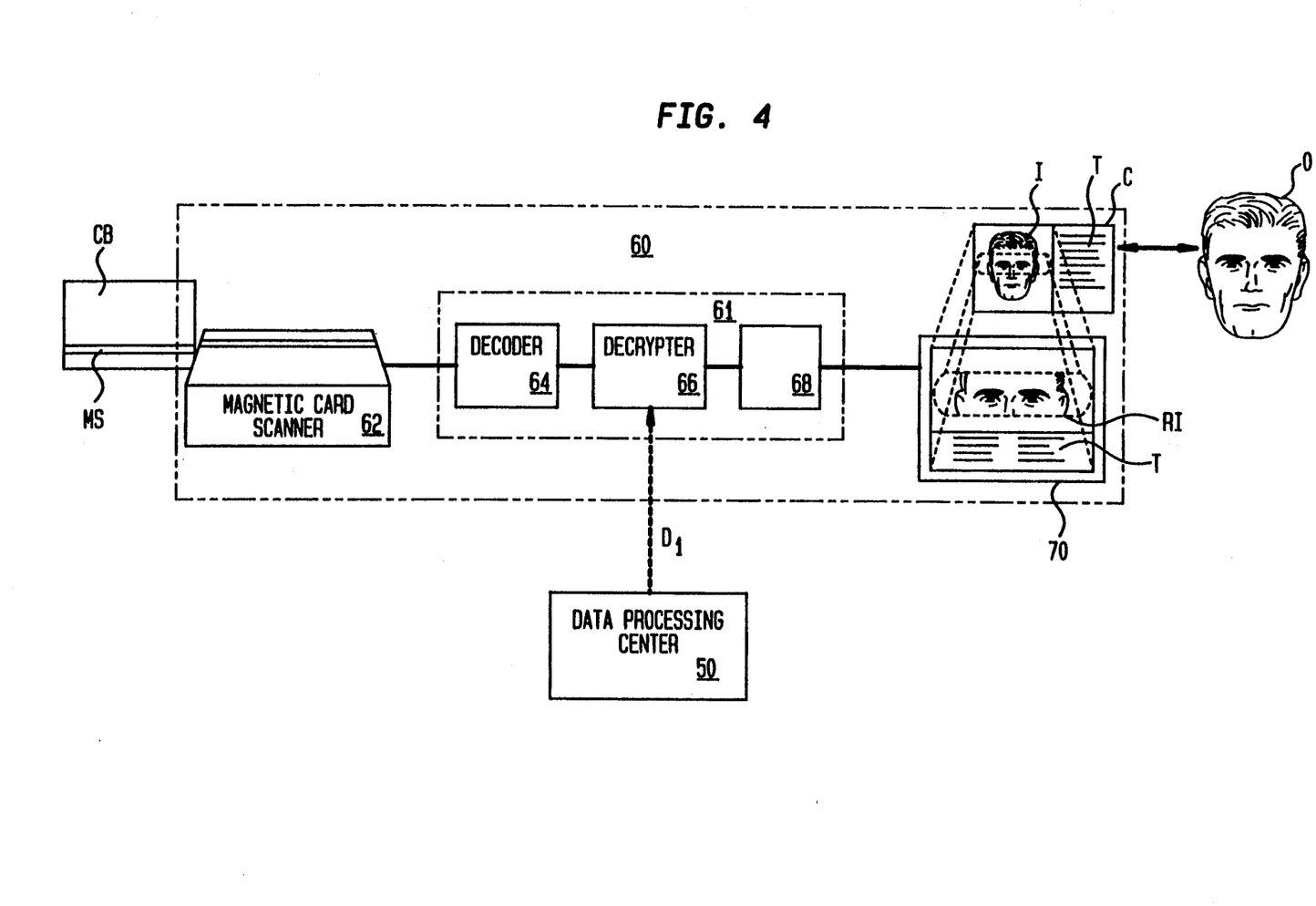
FIG. 4 is a schematic block diagram of an apparatus for validating an identification card produced in accordance with the subject invention.

Turning now to FIG. 4 apparatus 60 for validating an identification card C is shown. Magnetic stripe MS of card C is scanned by magnetic card scanner 62 having the capability to scan stripe MS. The scanned signal is then decoded by decoder module 64 and decrypted by decrypter module 66. In a preferred embodiment of the subject invention decrypter 66 stores decryption key $D_S$ which is used to decrypt encrypted key $E_S[D_i]$ to obtain decryption key $D_i$. Key $D_i$ is then used to decrypt the decoded signal scanned from stripe MS.

Key $D_S$ is obtained by decrypter 58 from center 50. Typically, $D_S$ will remain constant during operation of system 60, as described above, and a direct communication link between system 60 and center 50 is not necessary and key $D_S$ maybe transmitted in any convenient manner. However, in one application, where identification card C has a predetermined expiration date it may be desirable to change key $D_S$ after the expiration date and if such expiration dates occur sufficiently often a direct communication link to center 40 maybe included in system 50.

The decrypted scan signal is then expanded in by an algorithm complimentary to the compression algorithm used in system 10 in expanded module 68, in a conventional manner which need not be described further for an understanding of the subject invention.

In a preferred embodiment of the subject invention decoder module 64, decrypter module 66, and expander module 68 maybe implemented as software modules in a microprocessor 61.

The decrypted, expanded signal is then displayed by display 70. Display 70 is a stereographic superpositioning display which preferably incorporates a conventional liquid crystal display (LCD) similar to those commonly used in wristwatches. Card C is positioned behind display 62 and guides or other suitable means are provided so that image I is in proper registration with displayed representation RI.

Display 62 is controlled so that it switches, approximately 2 to 4 times a second between a transparent state and displaying representation RI. The transition is made quickly enough that it appears instantaneous to the human eye. As a result small differences between displayed representation RI and image I will appear to flicker and may be easily detected. Other techniques for achieving stereographic superposition such as the user of rotating mirrors, or half-silvered mirrors and shutters will be readily apparent to those skilled in the art.

The display includes a representation RI the extracted portion of image I and the text message T which was included in the encrypted second signal scanned from card back CB. The display may also include a password P, which is known to the person O authorized to have card C, but which is not included on card C, as described above.

To validate card C the user simply observes the stereographic superposition of displayed representation RI and image I, and if no flicker is observed, may have a high degree of confidence that card C has not been counterfeited or tampered with. The identity or status of object O may then be confirmed by comparison of image I and object O.

Those skilled in art will be aware that control of display 70 so that displayed representation RI is displayed in the proper representation and is switched at the proper frequency with the proper speed of transition is a routine matter well within the skill of those skilled in the art, and need not be discussed further here for an understanding of the subject invention.

Figure 5A:
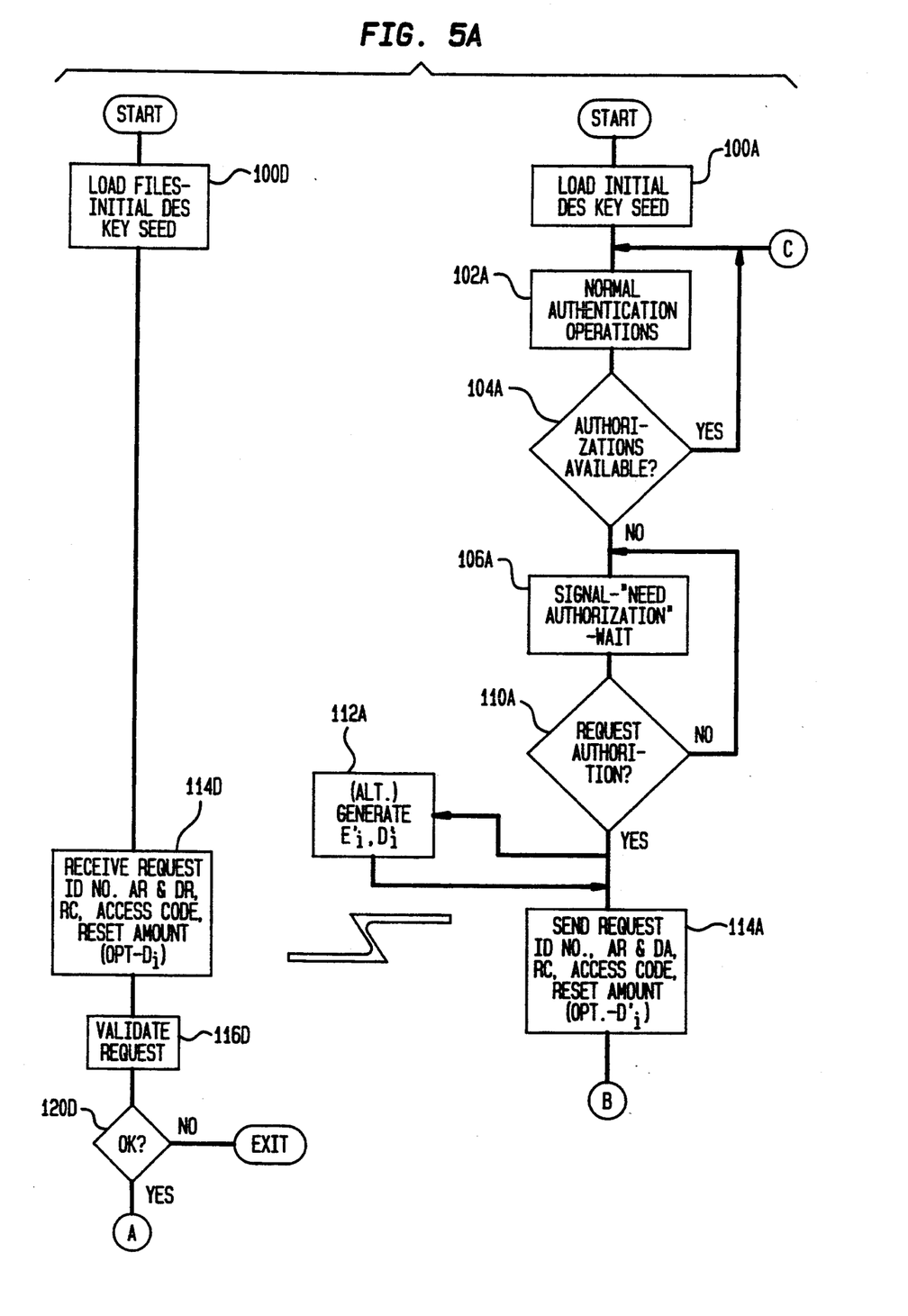
FIGS. 5A and 5B are flow charts of the operation of the apparatus and data processing center of FIG. 1.
Figure 5B:
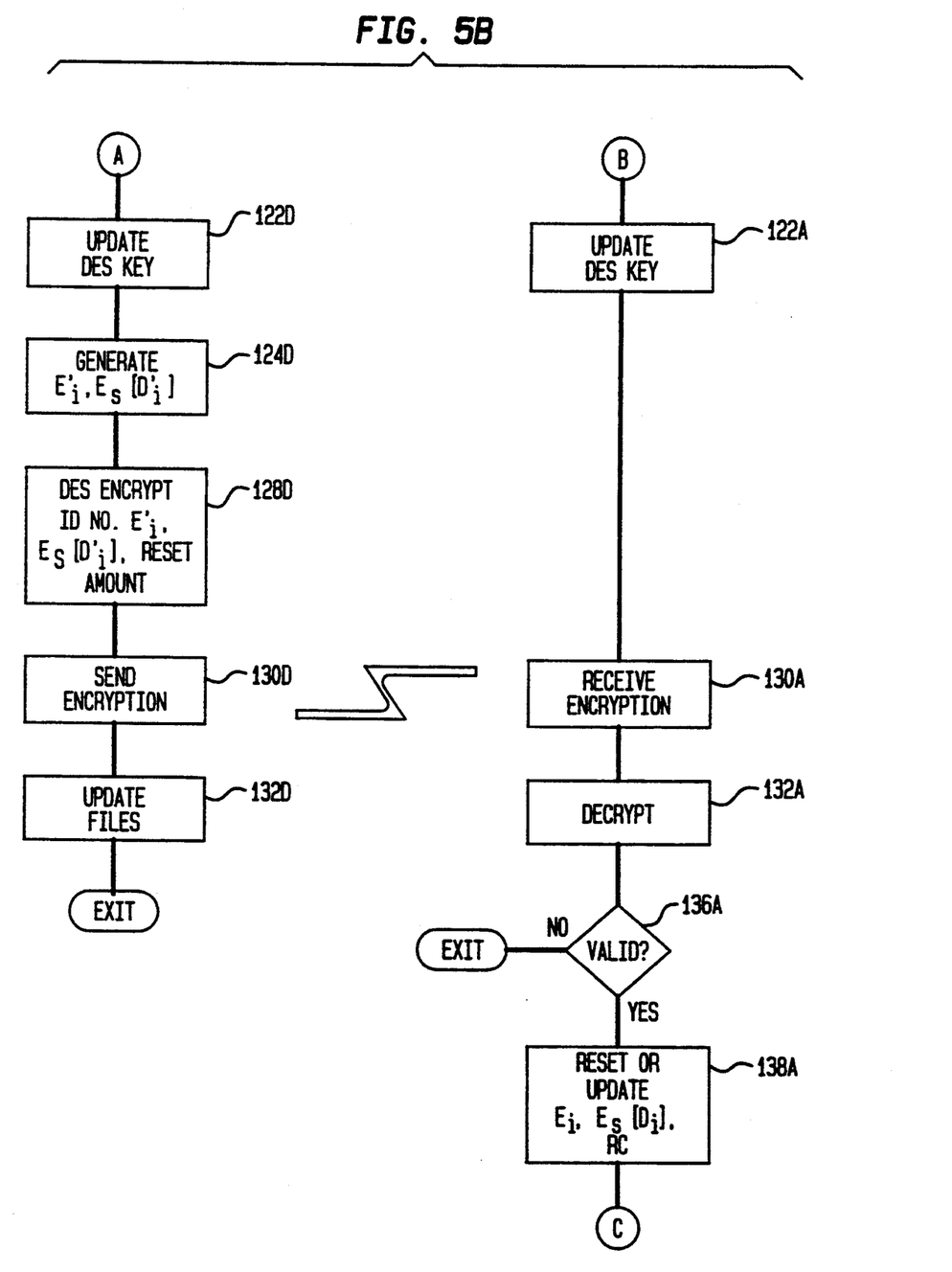

Turning to FIG. 5A and 5B the operation of controller 40 and remote data processing center 50 is shown. At 100A controller 40 loads an initial DES key seed, and at 100D center 50 loads the identical key seed and also loads files 50-4 with the initial data for apparatus 10 and each similar apparatus to which center 50 is connected.

Then at 102A apparatus 10 executes normal authentication operations to produce identification cards as described above. At 104A controller 40 tests to determine if continued authorizations to produce authorizations to produce cards are available; i.e. if descending register DR has not been decremented to zero. If authorizations remain controller 40 loops back to 102A and continues normal operations.

If no authorizations remain, then at 106A controller 40 generates a signal to an operator to advise the operator that apparatus 10 needs to be recharged with additional authorizations. At 110A controller 40 test to determine if the operator has provided instructions to request the authorization, and if not loops through 106A.

(The above description has been provided in a somewhat simplified form for ease of explanation, and those skilled in the art will recognize numerous alternatives sequences. For example, controller 40 may be preprogramed to automatically request additional authorizations, or may signal an operator, or a host computer providing overall system control, before all authorizations are exhausted so that normal operations may continue while a request for recharge is pending.)

Once controller 40 is directed to request recharge then in one embodiment, where there is doubt about the security of communications with center 50, controller 40 then goes to 112A to generate a new pair of encryption/decryption keys $E_i'$ $D_i'$ and goes to 114A If communications are considered secure then controller 40 goes directly to 114A and sends a request message which typically will include information to identify apparatus 10 and its current state. In the preferred embodiment shown this information includes an ID number, the sum of registers AR and DR, the reset count RC, and access code derived by encrypting at least a portion of the information with the current DES key, and the recharge amount requested. If the communications link is considered insecure the message will also include the decryption code, $D_i$. (Note that even if communications are insecure, interception of decryption key $D_i'$ does not allow the person who intercepts the message to generate counterfeit identification cards.

At 114D remote data processing center 50 receives the message, and at 116 validates the message by testing it against data stored in files 50-4, and by decrypting the access code to validate the information encrypted in the access code. If the information is not successfully validated then at 120 D the data processing center exits to an error routine, which need not be described here for an understanding of the subject invention.

If the message is validated then at 122A and 122D both apparatus 10 and center 50 update the DES key. Each key is updated by applying the same algorithm to the current key, and additional information derived from the current state of apparatus 10 to generate an updated key. Thus, since the initial key seeds where identical the keys in apparatus 10 and center 50 will remain identical. Such a technique for updating of communication keys is used by Pitney Bowes Inc. assignee of the subject application, for recharge of postage meters and is described in more detail in U.S. Pat. Nos.: 4,097,923; to: Eckert, Jr. et al.; issued Jun. 27, 1978 and No. 4,447,890; to: Durwell et al.; issued: May 8, 1984 which are hereby incorporated by reference. By the changing the key for each transaction it is not possible for a dishonest user to use the same message to repeatedly recharge apparatus 10.

Then at 124D data processing center 50 generates a new encryption/decryption key pair $E_i'$ $D_i'$ and encrypts decryption key $D_i'$ with encryption key $E_s$ to obtain encrypted decryption key $E_s[D_i']$. Of course in the embodiment where communication is insecure and key $D_i$ is received from apparatus 10, center 50 will only generate encrypted decryption key $E_s[D_i']$ since encryption key $E_i'$ was generated in apparatus 10 initially.

Then at 128D center 50 encrypts a message including the ID number for apparatus 10, encrypted decryption key $E_s[D_i']$ and if communication is secure encryption key $E_i'$; and sends the encrypted message at 130D. At 130A apparatus 10 receives the encrypted message.

At 132D center 50 updates files 50-4 with the new state of apparatus 10. Files 50-4 may also be updated to reflect debits to an account maintained for the user of apparatus 10 so that the user may charge on a per card basis.

At 132A apparatus 10 decrypts the message received and tests the ID number to determine if the message is valid.

If the received message does not test as valid then at 136A controller 40 exits to an error routine which need not be describe further here for an understanding of the subject invention.

If the received message is valid then at 138A controller 40 will reset descending register DR and update keys $E_i$ and encrypted decryption key $E_s[D_i]$ with the new values received, and increment the reset counter. Controller then returns to normal operation at 102A.

The preferred embodiments described above have been given by way of example only, and other embodiments of the subject invention will be apparent to those skilled in the art from consideration of the detailed descriptions set forth above and the attached drawings. Particularly, the extracted portion has been shown as a single unitary image for convenience of explanation but may also comprise multipart, discontinuous elements. Accordingly, limitations on the subject invention are to be found only in the claims set forth below.

What is claimed is

1. Apparatus for producing an identification card, comprising:
    a) means for scanning an object or other entity to produce a first signal representative of an image of said object or other entity;
    b) means for printing said image on a first portion of said identification card;
    c) means for encrypting a second signal comprising a representation of at least a portion of said image, said second signal being derived at least in part from said first signal;
    d) means for incorporating a coded representation of said encrypted second signal into a second portion of said identification card; and
    e) means for controlling said apparatus, said controlling means further comprising;
        e1) rechargeable means for limiting the number of identification cards which can be produced until said rechargeable means is recharged; and
        e2) means for communicating with a remote data processing center to enable recharging of said rechargeable means; wherein
    f) said second signal is encrypted using an encryption key, $E_i$, for a public key encryption system; and wherein a decryption key, $D_i$, is encrypted with a second encryption key, $E_s$, for said public key encryption system to form an encrypted decryption key, $E_s[D_i]$; and wherein said encrypted decryption key, $E_s[D_i]$ is appended to said second signal prior to incorporation into said second portion;
    g) said rechargeable means further comprises a descending register for storing said number of identification cards which may be produced by said apparatus before said rechargeable means is recharged, said descending register being decremented as said identification cards are produced;
    h) said apparatus further comprises an ascending register which is incremented by an equal amount each time the descending register is decremented;
    i) said rechargeable means is recharged by incrementing said descending register, whereby the sum of said ascending register and said descending register is a control sum representative of the total amount by which said rechargeable means has been charged since said apparatus was initialized;
    j) said control means stores a communication key and said remote data processing center stores an identical communications key, and wherein said control means further comprises:
        j1) means for encrypting a message; said message including data derived from the current state of said control means and a serial number for said apparatus;
        j2) means for controlling said communications means to send said message to said remote data processing center and to receive a reply message, said reply message including a recharge amount and being encrypted with said communications key; and
        j3) means for decrypting said reply message and incrementing said descending register by said recharge amount; and,
    k) said reply message further includes a new encrypted decryption key $E_s[D_i']$, said control means replacing said key $E_s[D_i]$ with said new key, $E_s[D_i']$, for identification cards produced subsequent to recharge of said rechargeable means.

2. An apparatus as described in claim 1 wherein said reply message further includes a new encryption key, $E_1'$, said control means replacing said encryption key, $E_i$, with said new key, $E_i$, with said new key, $E_i'$, for identification cards produced subsequent to recharge of said rechargeable means.

3. An apparatus as describe in claim 1 wherein said control means further includes means for generating a new encryption/decryption key pair, $E_i'$, $D_i'$, said control means replacing said encryption key $E_i$ with said new key, $E_i'$, for identification cards produced subsequent to recharge of some recharge means, and controlling said communications means to send said new key, $D_i'$, to said remote data processing center.

4. A system for producing an identification card comprising:
    a) an authenticating apparatus, said authenticating apparatus further comprising:
        a1) means for scanning an object or other entity to produce a first signal representative of an image of said object or other entity;
        a2) means for printing said image on a first portion of said identification card;
        a3) means for encrypting a second signal comprising a representation of at least a portion of said image, said second signal being derived at least in part form said first signal;
        a4) means for incorporating a coded representation of said encrypted signal into a second portion of said identification card; and,
        a5) means for controlling said apparatus, said controlling means further comprising rechargeable means for limiting the number of identification cards which can be produced until said rechargeable means is recharged;
    b) a remote data processing center;
    c) communications means for communicating information between said remote data processing center and said authenticating apparatus; wherein, d) said remote data processing center is responsive to apparatus information representative of the state of said apparatus to send reply information to said apparatus;

e) said apparatus is responsive to said reply information to recharge said rechargeable means;

f) said second signal is encrypted using an encryption key, $E_i$, for a public key encryption system; and wherein a decryption key, $D_i$, is encrypted with a second encryption key, $E_s$, for said public key encryption system to form an encrypted decryption key, $E_s[D_i]$; and wherein said encrypted decryption key, $E_s[D_i]$ is appended to said second signal prior to incorporation into said second portion;

g) said rechargeable means further comprises a descending register for storing said number of identification cards which may be produced by said apparatus before said rechargeable means is recharged, said descending register being decremented as said identification cards are produced;

h) said system further comprises an ascending register which is incremented by an equal amount each time the descending register is decremented;

i) said rechargeable means is recharged by incrementing said descending register, whereby the sum of said ascending register and said descending register is a control sum representative of the total amount by which said rechargeable means has been charged since said apparatus was initialized;

j) said control means stores a communication key and said remote data processing center stores an identical communications key, and wherein said control means further comprises:

j1) means for encrypting a message; said message including said state information, and a serial number for said apparatus;

j2) means for controlling said communications means to send said message to said remote data processing center and to receive a reply message, said reply message including said reply information, said reply information including a recharge amount and being encrypted with said communications key; and j3) means for decrypting said reply message and incrementing said descending register by said recharge amount; and, k) said reply message further includes a new encrypted decryption key $E_s[D_i']$, said control means replacing said key $E_s[D_i]$ with said new key, $E_s[D_i']$, for identification cards produced subsequent to recharge of said rechargeable means.

5. An apparatus as described in claim 4 wherein said reply message further includes a new encryption key, $D_i'$, said control means replacing said encryption key, $E_i$, with said new key, $E_i'$, for identification cards produced subsequent to recharge of said rechargeable means.

6. An apparatus as described in claim 4 wherein said control means further includes means for generating anew encryption/decryption key pair, $E_i'$, $D_i'$, said control means replacing said encryption key $E_i$ with said new key, $E_i'$, for identification cards produced subsequent to recharge of said recharge means, and controlling said communications means to send said new key, $D_i'$, to said remote data processing center.

* * * * *